United States Patent
Shaffer et al.

(10) Patent No.: US 7,813,493 B2
(45) Date of Patent: Oct. 12, 2010

(54) METHOD AND SYSTEM FOR HANDLING CALLS AT AN AUTOMATIC CALL DISTRIBUTION SYSTEM

(75) Inventors: Shmuel Shaffer, Palo Alto, CA (US); Labhesh Patel, Mountain View, CA (US); Joseph F. Khouri, San Jose, CA (US); Gebran G. Chahrouri, Menlo Park, CA (US); Mohammed I. Darwish, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1187 days.

(21) Appl. No.: 11/114,599

(22) Filed: Apr. 25, 2005

(65) Prior Publication Data
US 2006/0239440 A1 Oct. 26, 2006

(51) Int. Cl.
*H04M 3/00* (2006.01)
(52) U.S. Cl. .............................. 379/265.01; 379/265.08
(58) Field of Classification Search . 379/265.01–266.1; 705/7–9, 11; 709/201–203, 228
See application file for complete search history.

(56) References Cited

U.S. PATENT DOCUMENTS

| | | | | | |
|---|---|---|---|---|---|
| 5,020,095 | A | * | 5/1991 | Morganstein et al. | 379/88.23 |
| 5,299,260 | A | * | 3/1994 | Shaio | 379/266.07 |
| 5,621,789 | A | * | 4/1997 | McCalmont et al. | 379/265.06 |
| 5,721,770 | A | * | 2/1998 | Kohler | 379/265.12 |
| 5,825,869 | A | * | 10/1998 | Brooks et al. | 379/265.12 |
| 5,828,747 | A | | 10/1998 | Fisher et al. | 379/265.12 |
| 6,052,460 | A | | 4/2000 | Fisher et al. | 379/265.12 |
| 6,356,632 | B1 | | 3/2002 | Foster et al. | 379/265.04 |
| 6,366,666 | B2 | * | 4/2002 | Bengtson et al. | 379/265.06 |
| 6,490,350 | B2 | * | 12/2002 | McDuff et al. | 379/265.06 |
| 6,694,009 | B1 | * | 2/2004 | Anderson et al. | 379/266.06 |
| 6,714,643 | B1 | | 3/2004 | Gargeya et al. | 379/266.06 |

(Continued)

FOREIGN PATENT DOCUMENTS

DE 103 09 791 A1 9/2004

(Continued)

OTHER PUBLICATIONS

"Call Center, Features & Benefits", Avaya Tenovis, http://www.avaya.fr/Produits/Call_Center/feature%20benefits/features_benefits.asp, © Avaya Inc., 2 pages, 2003.

(Continued)

*Primary Examiner*—Fan Tsang
*Assistant Examiner*—Assad Mohammed
(74) *Attorney, Agent, or Firm*—Baker Botts L.L.P.

(57) ABSTRACT

A method for handling calls at an automatic call distribution system includes receiving a first call for connection with one of a plurality of agents and distributing the first call to a first agent of the plurality of agents. The method includes presenting to the first agent at least one target time associated with handling the first call and modifying the at least one target time associated with handling the first call based on call parameters and a service level goal. The call parameters comprise a status of a queue comprising calls awaiting connection with agents. The method also includes presenting the at least one modified target time associated with handling the first call to the first agent.

38 Claims, 3 Drawing Sheets

U.S. PATENT DOCUMENTS

| | | | |
|---|---|---|---|
| 6,748,072 B1 | 6/2004 | McGraw et al. | 379/265.03 |
| 6,798,876 B1 * | 9/2004 | Bala | 379/265.12 |
| 7,127,059 B2 * | 10/2006 | Galvin | 379/265.03 |
| 7,539,297 B2 * | 5/2009 | Whitman, Jr. | 379/266.08 |
| 2003/0054843 A1 * | 3/2003 | Notani et al. | 455/466 |

FOREIGN PATENT DOCUMENTS

| | | |
|---|---|---|
| EP | 0 647 050 A2 | 4/1995 |
| EP | 0 647 050 A3 | 1/1999 |
| EP | 1 011 256 A2 | 6/2000 |
| EP | 1 011 256 A3 | 8/2003 |

OTHER PUBLICATIONS

PCT, International Search Report and Written Opinion (ISA/EPO)dated Aug. 16, 2006 for PCT/US2006/013675, 13 pages.

* cited by examiner

METHOD AND SYSTEM FOR HANDLING CALLS AT AN AUTOMATIC CALL DISTRIBUTION SYSTEM

TECHNICAL FIELD OF THE INVENTION

This invention relates in general to communication systems and, more particularly, to a method and system for handling calls at an automatic call distribution system.

BACKGROUND OF THE INVENTION

Automatic call distributors (ACDs) and other contact or call centers typically include specialized systems designed to match incoming requests for service, for example a telephone call or an e-mail, with a resource that is able to provide that service, for example a human call center agent. ACDs generally perform one or more of the following functions: (i) recognize and answer incoming calls; (ii) review database(s) for instructions on what to do with a particular call; (iii) using these instructions, identify an appropriate agent and queue the call, often times providing a prerecorded message; and (iv) connect the call to an agent as soon as the agent is available.

Hosted ACD call centers enable customers to focus on their core business while reducing capital expenditure and freeing them from the hassle of managing call center resources (e.g., agents and equipment). Such hosted center may include providing equipment, agents and supervisors to handle incoming calls on behalf of customers (clients). As part of the contract between the hosted ACD service provider and their clients, a service level agreement (SLA) may be negotiated. One key aspect of the SLA is meeting predetermined service level goals (SLGs) or targets such as answering a specified percent of incoming calls are within a predetermined time (e.g., 80% of incoming calls must be answered within 20 seconds). The hosted ACD service provider may be paid in accordance with its ability to meet the agreed upon SLA.

Hosted ACD service providers may continuously optimize their operation between two conflicting requirements, reducing cost and maintaining or increasing performance and customer satisfaction (e.g., meeting or exceeding a SLA). They would like to reduce the number of ACD agents (typically the most expensive resource) in order to reduce their payroll cost. However, reducing the number of agents may prevent them from achieving their committed SLA and hence may adversely impact payment from their clients.

Many existing systems continuously monitor and display the ACD queue length to agents and supervisors. Systems are programmed to alert agents and supervisors when the length of a specific queue is longer than a preprogrammed value. Some existing systems assume a fixed talk time and after call work time (e.g., time for handling contacts and performing the post call wrap-up functions).

Some systems, such as those from Avaya, aim to improve the service level (SL) by dynamically moving agents between queues. To achieve this functionality, these systems continuously calculate the SL for each queue. If they find that a certain queue is able to meet its target SLA while another queue is falling behind, the system automatically moves agents from the queue that meets the SL to the queue that is falling behind.

Many companies use workforce management (WFM) systems that specialize in demand forecasting and workforce planning. Systems of such companies may project the number of incoming calls based on historical information and may calculate the number of agents required to answer calls in order to meet a given SLG. Other companies employ a flexible workforce trained to handle multiple tasks. As the number of callers in the ACD queue increases, all agents are asked to answer incoming calls. However during a low volume of incoming calls, agents perform other (non-ACD related) duties.

Some call centers employ large bulletin boards (reader boards) advising agents of the queue length. As the number of callers in the ACD queue increases, the numbers on the bulletin board may turn red to alert agents of the increased demand.

SUMMARY OF THE INVENTION

The present invention provides a method and system for handling calls at an automatic call distribution system that substantially eliminates or reduces at least some of the disadvantages and problems associated with previous methods and systems.

In accordance with a particular embodiment, a method for handling calls at an automatic call distribution system includes receiving a first call for connection with one of a plurality of agents and distributing the first call to a first agent of the plurality of agents. The method includes presenting to the first agent at least one target time associated with handling the first call and modifying the at least one target time associated with handling the first call based on call parameters and a service level goal. The call parameters comprise a status of a queue comprising calls awaiting connection with agents. The method also includes presenting the at least one modified target time associated with handling the first call to the first agent.

The at least one target time associated with handling the first call may comprise a target call duration and a target call wrap-up duration. The call parameters may comprise a duration of time the first agent has spent on the first call and a profile of a caller of the first call. The method may also include receiving feedback from the first agent regarding handling of the first call, and modifying the at least one target time associated with handling the first call based on call parameters may comprise modifying the at least one target time associated with handling the first call based on the feedback received from the first agent. The feedback may comprise an estimation of the ability of the first agent to complete the first call within a target duration. The service level goal may comprise a percentage of incoming calls that must be distributed to an agent within a predefined time frame.

In accordance with another embodiment, a system for handling calls at an automatic call distribution system includes an interface operable to receive a first call for connection with one of a plurality of agents and a distributor coupled to the interface and operable to distribute the first call to a first agent of the plurality of agents. The system includes a processor coupled to the distributor and operable to present to the first agent at least one target time associated with handling the first call and modify the at least one target time associated with handling the first call based on call parameters and a service level goal. The call parameters comprise a status of a queue comprising calls awaiting connection with agents. The processor is also operable to present the at least one modified target time associated with handling the first call to the first agent.

Technical advantages of particular embodiments include methods and systems for handling calls at an automatic call distribution system that provide target call and wrap-up durations for agents based on service level goals and continuously monitored events, conditions and parameters associated with the automatic call distribution system, such as incoming call rate, queue status (e.g., length, number and type of calls waiting in the queue), identity of callers and average agent call time. Agents may provide feedback on their ability to meet certain goals for call and wrap-up time, and the feedback may be used to modify target times for those agents providing feedback and for other agents. Thus, efficiency of automatic call distribution systems is improved as agents are informed of target times that will better enable the call center or system to reach service level commitments.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
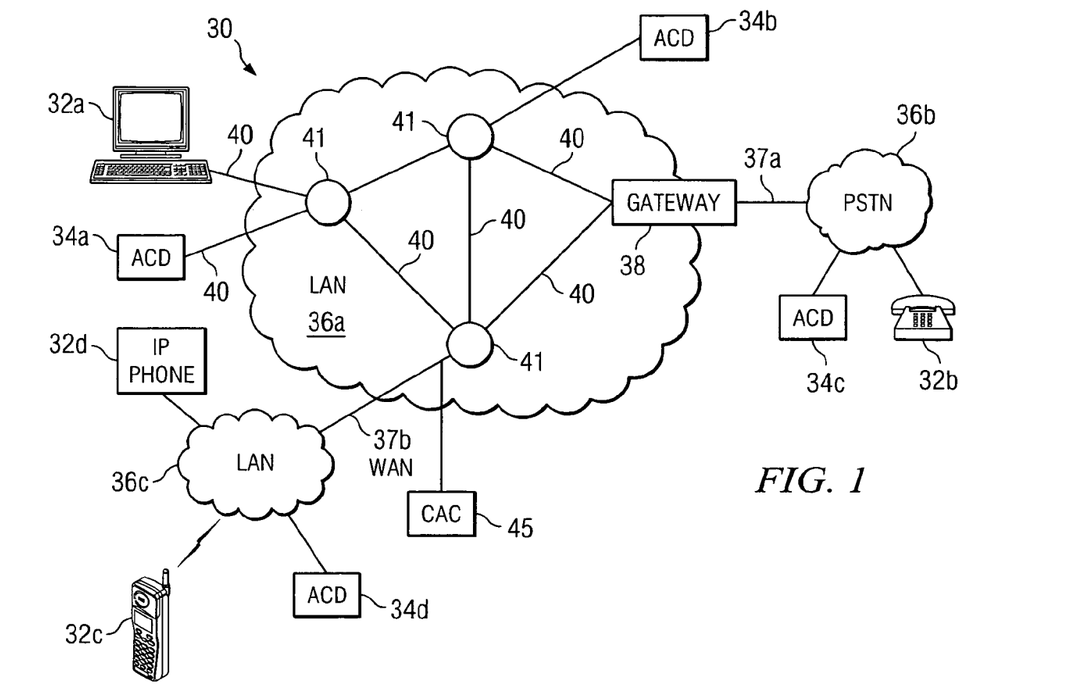
FIG. 1 illustrates a communication system including a plurality of endpoints operable to communicate among each other and a plurality of automatic call distributors, in accordance with a particular embodiment of the present invention.

FIG. 1 illustrates a communication system 30 including a plurality of endpoints 32a-32d having the ability to establish communication sessions between each other and/or automatic call distributors (ACDs) 34a-34d, using one or more of communication networks 36a-36c. ACDs are specialized communication systems designed to route incoming calls to available agents, so that calls are properly and/or evenly distributed. For the purposes of this specification, "automatic call distributor" or "ACD" shall refer to any combination of hardware, software and/or embedded logic which is operable to automatically distribute incoming calls. ACDs may comprise hosted or non-hosted call centers. "Calls" shall include requests for service transmitted using any audio and/or video means, including signals, data or messages transmitted through voice devices, text chat, web sessions, facsimile, instant messaging and e-mail. ACDs may include outsourced call centers or other contact centers that receive incoming customer calls for distribution to agents and that may place calls from agents to customers.

In particular embodiments, ACD systems provide target call and wrap-up durations for agents based on service level goals and continuously monitored events, conditions and parameters associated with the ACD system, such as incoming call rate, queue status (e.g., length, number and type of calls waiting in the queue), identity of callers and average agent call time. Agents may provide feedback on their ability to meet certain goals for call and wrap-up time, and the feedback may be used to modify target times for those agents providing feedback and for other agents. Thus, efficiency of automatic call distribution systems is improved as agents are informed of target times that will better enable the call center or system to reach service level commitments.

In the illustrated embodiment, communication network 36a is a local area network (LAN) that enables communication between a plurality of endpoints 32a-32d and ACDs 34a-34d distributed across multiple cities and geographic regions. In another embodiment, a single, central ACD may be used, which distributes incoming calls to agents distributed across multiple cities and geographic regions. Communication network 36b is a public switched telephone network (PSTN) and couples endpoint 32b and ACD 34c with communication network 36a through gateway 38. Communication network 36c is another LAN, which couples endpoints 32c and 32d and ACD 34d with communication network 36a. Accordingly, users of endpoints 32a-32d and automatic call distributors 34a-34d can establish communication sessions between and among each network component coupled for communication with one or more of networks 36a-36c. Communication links 37a and 37b couple communication networks 36a and 36b, and communication networks 36a and 36c, respectively. In the illustrated embodiment, communication link 37b is a wide area network (WAN), which couples LANs 36a and 36c. A call admission control (CAC) system 45 may be used to monitor and police the bandwidth available over WAN 37b.

Communication network 36a includes a plurality of segments 40 and nodes 41 that couple endpoint 32a with ACDs 34a and 34b, gateway 38 and communication networks 36b-36c. Therefore, a user of endpoint 32a is provided with access to endpoints 32b-32d, and automatic call distributors 34a-34d. Nodes 41 may include any combination of network components, gatekeepers, call managers, conference bridges, routers, hubs, switches, gateways, endpoints, or other hardware, software, or embedded logic implementing any number of communication protocols that allow for the exchange of packets in communication system 30.

Although the illustrated embodiment includes three communication networks 36a-36c, the term "communication network" should be interpreted as generally defining any network capable of transmitting audio and/or video telecommunication signals, data, and/or messages, including signals, data or messages transmitted through text chat, instant messaging and e-mail. Any one of networks 36a-36c may be implemented as a local area network (LAN), wide area network (WAN), global distributed network such as the Internet, Intranet, Extranet, or any other form of wireless or wireline communication network. Generally, network 36a provides for the communication of packets, cells, frames, or other portions of information (generally referred to as packets herein) between endpoints 32a-32d. Communication network 36a may include any number and combination of segments 40, nodes 41, endpoints 32a-32d, and/or ACDs 34a-34d.

In a particular embodiment, communication network 36a employs voice communication protocols that allow for the addressing or identification of endpoints, nodes, and/or ACDs coupled to communication network 36a. For example, using Internet protocol (IP), each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data using frames or packet, are included within the scope of the present invention.

Network 36a may be directly coupled to other IP networks including, but not limited to, another LAN or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, endpoint 32d, ACDs 34a-34b, and gateway 38 are IP telephony devices capable of participating in IM, video, and other multimedia communication sessions. IP telephony devices have the ability of encapsulating a user's voice (or other input) into IP packets so that the voice can be transmitted over network 36a. IP telephony devices may include telephones, fax machines, computers running telephony software, nodes, gateways, wired or wireless devices, hand held PDA, or any other device capable of performing telephony functions over an IP network.

In particular embodiments, communication system 30 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

It will be recognized by those of ordinary skill in the art that endpoints 32a-32d, ACDs 34a-34d and/or gateway 38 may be any combination of hardware, software, and/or encoded logic that provides communication services to a user. For example, endpoints 32a-32d may include a telephone, a computer running telephony software, a video monitor, a camera, an IP phone, a cell phone or any other communication hardware, software and/or encoded logic that supports the communication of packets of media (or frames) using communication network 36a. Endpoints 32a-32d may also include unattended or automated systems, gateways, other intermediate components or other devices that can establish media sessions. Although FIG. 1 illustrates a particular number and configuration of endpoints, ACDs, segments, nodes, and gateways, communication system 30 contemplates any number or arrangement of such components for communicating media.

Figure 2:
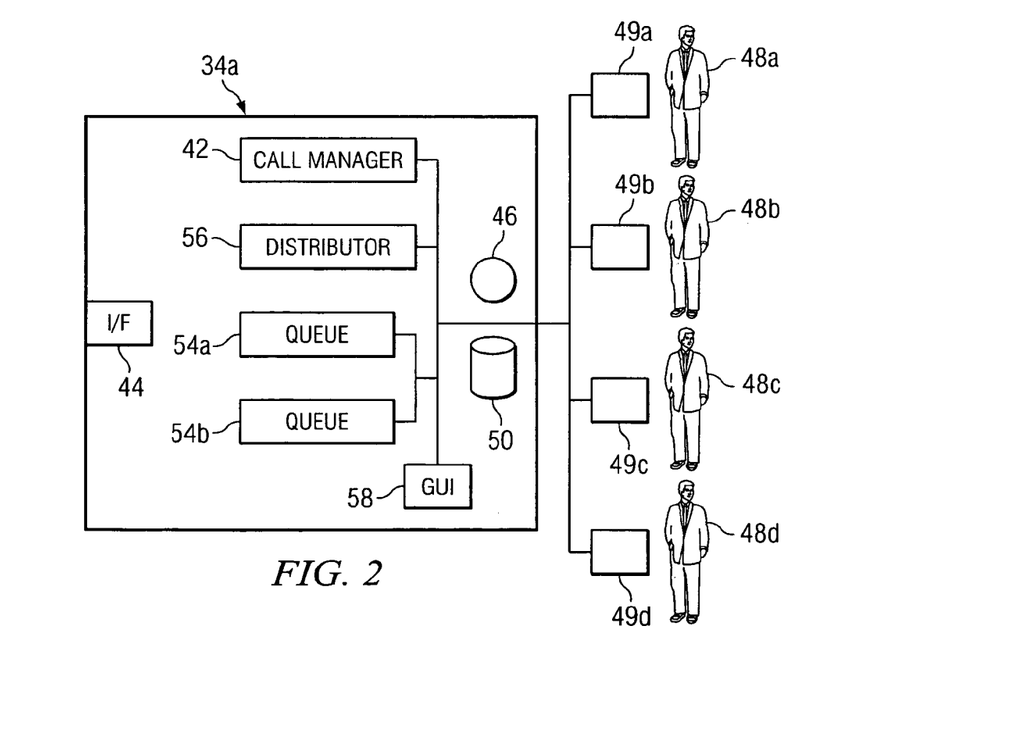
FIG. 2 illustrates an automatic call distributor of FIG. 1 in more detail, illustrating aspects of the present invention.

FIG. 2 illustrates ACD 34a in more detail, in accordance with a particular embodiment of the present invention. In the illustrated embodiment, ACD 34a includes a call manager 42, an interface or input ports 44, a processor 46, memory module 50, queues 54, a distributor 56 and a graphical user interface (GUI) 58. Interface or input ports 44 couple ACD 34a with communication network 36a. Processor 46 may be a microprocessor, controller, or any other suitable computing device, resource, or combination of hardware, software and/or encoded logic. Memory module 50 may be any form of volatile or non-volatile memory including, without limitation, magnetic media, optical media, random access memory (RAM), read-only memory (ROM), removable media, or any other suitable local or remote memory component.

The illustrated embodiment includes agents 48 associated with ACD 34a. It should be understood that ACDs in accordance with various embodiments may be associated with any suitable number of agents 48. Agents 48 use respective endpoints 49 to communicate with callers to ACD 34a. Callers may utilize any suitable endpoints when calling ACD 34a to request connection with an agent, such as endpoints 32a-32d of FIG. 1. Endpoints 49 may be similar to one or more of the endpoints described above with respect to FIG. 1, such as IP phone endpoint 32d. It should be understood that endpoints 49 may be coupled to ACD 34a through one or more communication networks, such as the communication networks described above with respect to FIG. 1 which may include one or more WANs or LANs as indicated above.

Call manager 42 maintains information on all agents and other users of system 30 and facilitates communication among users. Call manager 42 may be any combination of hardware, software, and/or encoded logic and is used by ACD 34a to manage agents 48 and other users of system 30. In particular embodiments, call manager 42 may maintain a listing, table, or other organization of information about agents 48 and other users of system 30. The information may include a name or other identifier for each agent 48 and other user. The information may also include contact information such as phone numbers and email addresses for the agents 48 and users. For identifying agents 48a-48d that may be contacted or otherwise recruited to handle incoming calls received by the ACD 34a, call manager 42 may also include information identifying whether a user of system 30 is a call agent or performs other tasks within the organization. As is the case with other components of ACD 34a, in particular embodiments the functionality of call manager 42 may be performed by hardware, software or encoded logic distributed throughout a communication network coupled with the ACD.

When an incoming call is received by processor 46, processor 46 determines if a suitable agent 48 is available to receive an incoming call. If a suitable agent is available to receive the incoming call, distributor 56 distributes the call to such agent for handling. For example, distributor 56 may connect a voice or video call with the available suitable agent. If a suitable agent is not available, the call may be placed into a queue 54 in order to wait for an appropriate agent(s). In this embodiment, ACD 34a has two queues 54; however other embodiments of the present invention may have none, one or more than two queues 54. The selection of which queue 54 to place an incoming call may depend on the type of customer making the call, the type of service requested in the call or any other characteristic or condition relating to the call or to ACD 34a. While a customer is waiting for an agent, ACD 34a may perform one or more of several functions including data collection from the user, playing of prerecorded messages, or other automated process. As soon as a suitable agent becomes available, distributor 56 distributes the call to the appropriate agent.

Once an agent is through handling a call, the agent may be required to perform various tasks such as summarizing any call issues, entering a customer order or any other particular tasks required as a result of the call, the caller, the ACD host or the business to which the call relates. The period of time in which the agent performs such tasks may be identified as wrap-up time, and ACD 34a may wait until the agent completes the wrap-up tasks before distributing another call to the agent for handling.

GUI 58 presents information to agents 48 and other users of ACD 34a. In particular embodiments, GUI 58 may present information to agents through their respective endpoints 49. In some embodiments, information may be presented through one or more electronic bulletin boards within sight of the agents. Any suitable information may be presented by GUI 58, such as information to help increase the efficiency of ACD 34a and its users and agents. In some embodiments GUI 58 may present goals or targets for call (talk) and wrap-up time duration.

As indicated above, particular embodiments calculate and present to agents target call and wrap-up durations based on continuously monitored parameters to better enable a call center or ACD host to meet its service level goals (SLGs). Such parameters may include a required SLG, a length of a queue 54 (i.e., number and/or type of calls awaiting connection with an agent), specific time each agent as already spent on a respective current call, duration of time each caller has already spent in queue, profiles of callers and incoming call load during an interval of time (e.g., such as a time period typically considered "busy"). These parameters are merely examples of parameters which may be used by an ACD to calculate target call and wrap-up times. Other suitable parameters may be used in various embodiments. In addition, one or more of the parameters listed may be optional in some cases. For example, profiles of callers may comprise an optional parameter. In this case, an agent taking a call with a more important caller (e.g., a highly valued customer) may be allotted more talk time for the agent to handle the call.

As discussed above, in particular embodiments ACD 34a continuously monitors various parameters, such as the time each caller has spent in queue. ACD 34a, for example through processor 46, may also continuously calculate an agent fixed call duration and an agent fixed wrap-up duration for calls handled by each agent and the overall system average call duration and system average wrap-up duration for all agents. In addition, the system may monitor the length of time agents have already spent handling their respective current contact and may calculate their projected availability time. Based on this calculation, ACD 34a can assess if enough agents will free up to handle the callers waiting in queues 54 in time to meet one or more SLGs. As long as the ACD calculates that it can meet desired SLGs with the initial fixed call duration and fixed wrap-up duration, the system may present variable call durations and variable wrap-up durations substantially identical to the fixed call duration and fixed wrap-up duration, respectively.

As the call volume for ACD 34a increases, the aforementioned calculations may indicate that the ACD may not be able to meet a SLG if it continues to operate within the same parameters. To alleviate this problem, the ACD system, for example through processor 46, may calculate variable call and wrap-up durations that are shorter than the fixed call and wrap-up durations. If agents are able to meet these variable duration goals, then the ACD may more easily meet its SLA goals. When the new durations are calculated, they may be presented to specific agents as new goals for handling their current contacts. In some embodiments, all relevant agents may be presented with the same shorter variable call and wrap-up durations. The receipt of a new call may affect target call and wrap-up durations (i.e., require shorter target durations to meet a SLG) for a plurality of agents each handling their own calls when the new call is received.

In particular embodiments, the shortening of the variable call duration presented to an agent may be proportional to the projected time left for the agent's current call to be handled. The longer the remaining time, the greater is the reduction in the target variable call duration time. For example, if agent 48a has already spent two minutes and thirty seconds on a particular call, while agent 48b has just started handling a call and has spent only ten seconds with that call, ACD 34a may present a variable call duration to agent 48a that is shorter than a normal or fixed call duration by, for example, only five seconds while presenting a variable call duration to the second agent that is shorter than a normal or fixed call duration by, for example, thirty seconds. In other words, in some embodiments the percentage by which a typical, fixed or normal call duration is reduced to determine a variable call duration may be less the longer an agent has been handling a particular call for which the variable call duration is determined. A similar calculation may be performed for the wrap-up duration.

The calculations for variable call and/or wrap-up durations may be performed by iteratively reducing the variable call and/or wrap-up durations within the preprogrammed durations (e.g., normal or fixed durations), while keeping the number of agents constant, until the system finds the optimized durations that will allow the call center to meet its SLGs. As indicated above, once the appropriate variable call and wrap-up times are calculated, they are presented accordingly to the applicable agent(s).

In particular embodiments, ACD 34a may keep track of the cumulative shortening of the wrap-up duration for each agent. This cumulative shortening time may provide a measure of how much time each agent has fallen behind in his paperwork or other call wrap-up tasks. As the call load into the call center is reduced, the system may increase the wrap-up duration for the agent to allow the agent to catch up with his paperwork and tasks. In some cases, however, catching up with wrap-up time for a call handled earlier in time may not be practical.

In particular embodiments, an agent feedback mechanism may be implemented to increase the accuracy of the duration computations. For example, an agent may be requested to provide the ACD with information regarding his projected ability to comply with the goals set for him. The feedback request for a call may be transmitted while an agent is currently communicating on the call. The agent may be requested to let the system know if he will be able to handle the contact within the requested variable call and/or wrap-up parameters. For example, if the agent is handling a difficult caller, he may indicate to the system that he will need to go over the target call duration goal. The agent may provide this feedback through any suitable method, such as through his respective endpoint 49. Some embodiments may use a whisper feature, special GUI, instant message or e-mail to alert agents that they need to provide the system with their estimation for the time it will take them to complete the handling of their current call. In some embodiments, the agent may only have the ability to reply with a "yes" or "no" when prompted to reply whether he will be able to complete the discussion with his current contact within the goal set for him. In some embodiments, the agent may be able to enter the estimated additional time he requires to complete the handling of his current contact. The input or feedback from the agent may be taken into consideration and embedded into the calculations discussed herein.

In particular embodiments, ACD 34a may keep track of the ability of the agents to accommodate requests to shorten their respective call and wrap-up durations in face of an increased volume of calls. In addition, the ACD may keep track of the ability of agents to meet their commitments to complete calls and paperwork within a shorter duration. Agents who excel in this area become more valuable as they are instrumental to the ability of the call center to meet its SLA, particularly when faced with a spike in demand.

Calculations, such as those for target call and wrap-up durations, to better enable an ACD system or call center to meet its SLGs may be performed using any suitable methods, such as various traffic engineering methodologies (e.g., Erlang) and other queuing and mathematical models to achieve the desired results. In particular embodiments, inbound call center traffic modeling utilizes callers (e.g., traffic sources generating calls or service requests into the contact center) and trunks or gateway ports, IVR ports and agents. Traffic models used in contact centers include the Erlang-B and Erlang-C models. Basic inputs into the models may include call arrival rate (service request rate), average handle/hold time, after call work time (wrap-up time), SLGs and blockage percentage or grade of service. Call arrival rate may comprise the number of calls arriving at the contact center in a specified period of time such as fifteen minutes, thirty minutes or one hour (e.g., during a busy interval). In particular cases, call arrival rate may be an actual rate for a certain period of time or a projected rate based on calls projected to be received. Average handle/hold time (AHT) may represent the average talk time (e.g., time to service a request or caller). In some cases, the average after call work time may be included in the AHT. SLGs may be expressed as the percentage of calls to be answered, distributed or an agent or completed within a desired time frame. This may include, for example, calls answered immediately without delay and a portion of delayed calls answered within the time frame specified (the other portion of delayed calls being answered beyond the SLG). Blockage percentage or grade of service may comprise the percentage of calls that will receive a busy signal (blocked) during the busy interval and may be used to size the trunks (servers) required to carry the traffic generated into the contact center. It may also be used to compute the IVR ports in cases where calls are treated first.

In some embodiments (e.g., when using the Erlang-B and Erlang-C traffic models), various assumptions may be made which may include the following: (1) number of sources (callers) requesting service is very large or infinite; (2) number of servers (trunks, IVR ports, agents) is limited compared to number of sources; (3) calls arrive in a random fashion (e.g., Poisson distribution) and are independent of each other; (4) the service time (to service a caller) is distributed exponentially and is independent of the call arrival rate; and (5) calls arriving are serviced in the order of the arrival, first-in, first-out (FIFO). Call arrivals in a contact center may not be uniform; they may follow a Poisson probability distribution similar to a normal bell-shaped curve. Most calls may arrive during a period that is shorter than the average call length, and few calls may take much longer than the average time to arrive. In addition, the call duration (service time) may not be uniform. Call lengths may be distributed exponentially where most calls are shorter in duration than the average call length, and some call lengths have much longer duration than the average call.

Particular embodiments discussed herein focus on the aspect where call durations are continuously tracked for each agent and for the system as a whole while dynamically computing the actual service level for specific intervals. This allows the system to compare actual service levels with desired service levels goals by computing required changes in call duration or wrap-up duration targets for each individual agent.

As indicated above, particular embodiments may implement the Erlang-B or Erlang-C models. Erlang-B is a model that assumes calls (service requests) are "blocked" or "lost" when servers are unavailable. In a contact center, callers finding all trunk ports or IVR ports unavailable may be blocked or denied service (caller receives busy signal). Erlang-B is most commonly used to compute required trunk and IVR ports in a contact center center. The Erlang-C model assumes calls (service requests) are queued or delayed when servers (agents) are unavailable. In a contact center, callers finding all agents busy or unavailable are not denied service but rather are put in a queue, such as queues 54 of ACD 34*a*, until an agent becomes available. Erlang-C is most commonly used to compute required agents in a contact center. There are many calculators readily available that use the Erlang-B and Erlang-C models to compute contact center resources and metrics. In addition, various organizations and companies, such as Cisco Systems, have developed their own call center calculators using the above models and other mathematical derivations. As indicated above, embodiments of the present invention may utilize any suitable call models or calculators to provide the functionality discussed herein.

It will be recognized by those of ordinary skill in the art that ACD 34*a* is merely one example configuration of an ACD for handling calls in accordance with particular embodiments. ACD 34*a* may include any number of interfaces, call managers, processors, memory modules, distributors and queues to accomplish the functionality and features described herein. For example, although ACD 34*a* is illustrated and described as including call manager 42, interface 44, processor 46, memory module 50, two queues 54, distributor 56 and GUI 58, these components and other desired components for performing the above described functionality may be centrally located (local) with respect to one another, or distributed throughout communication system 30. In addition, one or more components of ACD 34*a* may work together in performing various functionality described herein. For example, processor 46 and GUI 58 may work together to present target time information to agents, and distributor 56 and processor 46 may work together to distribute calls to agents.

Figure 3:
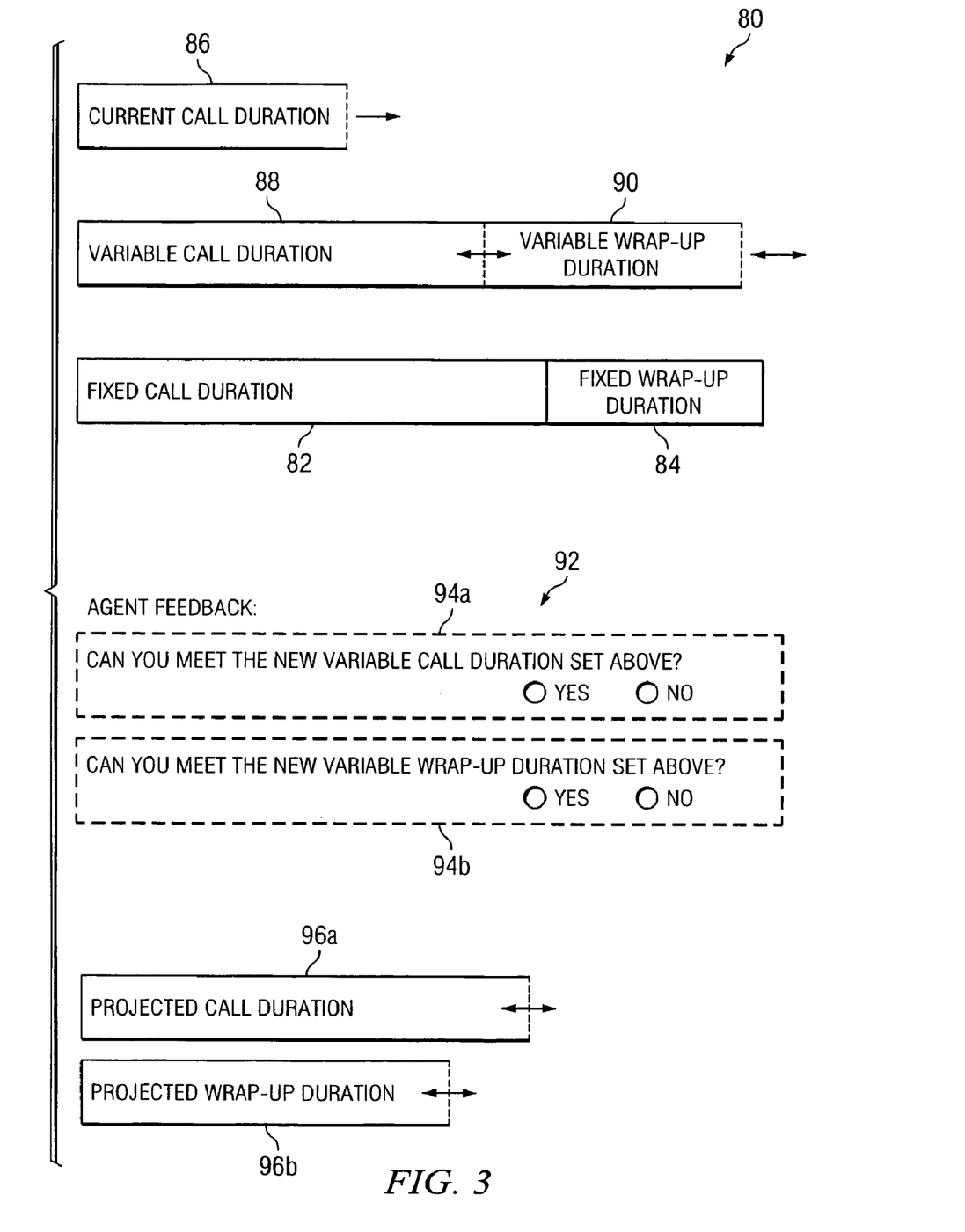
FIG. 3 illustrates an example graphical user interface display of target call and wrap-up durations that may be presented to agents in particular embodiments.

FIG. 3 illustrates an example GUI display 80 of target call and wrap-up durations that may be presented to agents in particular embodiments. As indicated above, a GUI of an ACD may display and present, for example using processor 46, target duration information using any suitable method, such as through agent endpoints or through one or more electronic bulletin boards. In addition, agents may be provided the ability to give feedback associated with their duration targets. In the illustrated embodiment, GUI display 80 includes a fixed call duration 82, a fixed wrap-up duration 84, a current call duration 86, an adaptive or variable call duration 88, an adaptive or variable wrap-up duration 90 and agent feedback section 92.

Fixed call duration 82 and fixed wrap-up duration 84 are fixed metrics and may be similar to those typically used in existing call center or ACD systems. These metrics are typically based on historical data of call duration average and wrap-up time average for all agents in the contact center. For example, agents may be expected to handle incoming calls in three minutes on average and spend an average of two minutes of wrap-up time after the completion of the calls. These would be represented as the fixed call duration 82 and fixed wrap-up duration 84.

Current call duration 86 provides a visual indication for the agent showing him how much time has elapsed since the current contact was presented to him. As long as the agent is handling a contact, this bar may continuously extend to the right.

Adaptive or variable call duration 88 and adaptive or variable wrap-up duration 90 present an adaptive goal for each agent as he is handling the current contact. As the length of an ACD queue increases and the call center is at risk of missing a SLG (e.g., because of increased customer demand, higher call volumes, etc.), the ACD 34a dynamically calculates the (shorter) variable call and wrap-up durations necessary to meet the SLG and presents them to individual agents. The bars for variable call duration 88 and variable wrap-up duration may move right or left depending on the ACD calculations of such targets for agents.

In some embodiments, in response to heavier demand, both the variable call and wrap-up durations may be reduced. In some embodiments, only the variable wrap-up duration may be reduced or eliminated altogether based on continuous monitoring of various parameters as discussed above. In particular embodiments, only the variable call duration may be reduced. In some cases, the variable call duration and wrap-up duration may be reduced only within pre-defined boundaries. For example, in order to maintain customer satisfaction, variable call time may not be reduced below a given minimum threshold.

Agent feedback section 92 includes feedback prompts 94 and feedback bars 96 and may be presented to agents, for example, via their respective endpoints. Feedback prompt 94a asks an agent to whom display 80 is presented whether the agent can meet the new variable call duration presented above (for example, variable call duration 88). The agent is given an option to enter yes or no in response to this prompt. Feedback prompt 94b asks an agent to whom display 80 is presented whether the agent can meet the new wrap-up duration presented above (for example, wrap-up duration 90). The agent is given an option to enter yes or no in response to this prompt. Feedback bar 96a gives an agent an opportunity to project a time in which the agent expects to complete a particular call by, for example, dragging the right side of the bar right or left. Feedback bar 96b gives an agent an opportunity to project a time in which the agent expects to complete a particular wrap-up for a call by, for example, dragging the right side of the bar right or left.

Display 80 of FIG. 3 is only one example of a manner in which target call and wrap-up durations may be presented to one or more agents. Other embodiments may utilize any suitable manner of displaying this calculated information to better enable the agent(s) to help meet SLGs of an ACD system. In addition, as indicated above some embodiments may not present an agent feedback option, and some embodiments may present an option for agent feedback in other manner according to particular operational desires and requirements.

Figure 4:
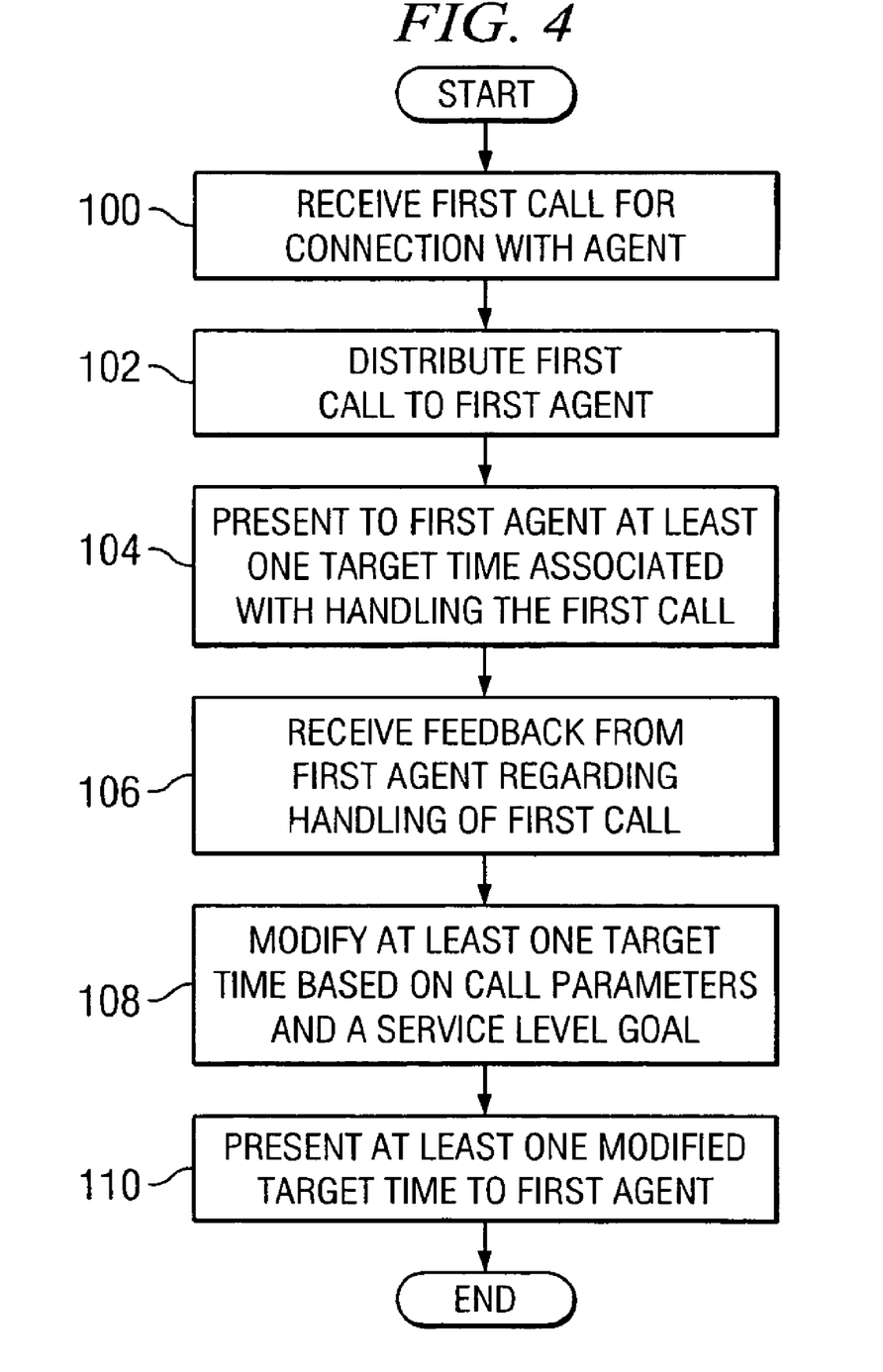
FIG. 4 illustrates a method for handling calls at an automatic call distribution system, in accordance with an embodiment of the present invention.

FIG. 4 is a flowchart illustrating a method for handling calls at an automatic call distribution system, in accordance with a particular embodiment. The method begins at step 100 where a first call is received for connection with an agent. The first call may be received at an ACD system, such as a system including ACD 34a. At step 102, the first call is distributed to a first agent which may be selected by the ACD out of a plurality of agents associated with the ACD. The first call may be distributed by a distributor, which may include an ACD processor.

At step 104, at least one target time associated with handling the first call is presented to the first agent. Such presentation may be implemented by a processor, for example in conjunction with a GUI. The at least one target time may include a target call or talk time for the call and/or a target wrap-up time for handling tasks related to the call after termination of the call. In some embodiments, other call time information may be presented to the first agent, such as current call duration, average call and/or wrap-up times for the agent or other agents and fixed target call and/or wrap-up times.

At step 106, feedback is received from the first agent regarding handling of the first call. This feedback may include, for example, an indication from the first agent how likely or whether the agent feels it is likely that the agent will complete a call or wrap-up within particular target durations. In some cases, the feedback may include an actual projected time from the agent in which the agent expects to complete a call or wrap-up. The feedback may be received through any suitable manner, such as through an agent's respective endpoint via IM, SMS, e-mail or other communication method. The feedback may be received in a numerical or other manner, such as through a drag and drop user interface.

At step 108, the at least one target time presented to the first agent is modified based on call parameters and a service level goal. The modification thus yields one or more variable target times (such as a variable call or wrap-up duration). The at least one target time may be continuously modified based on call parameters and a service level goal. The call parameters may comprise, for example, an amount of time the first agent has been on the first call, feedback received from the first agent or from other agents, a profile of the caller of the first call, an arrival rate of new incoming calls to the ACD and a queue status of the ACD (e.g., number and type of calls awaiting connection with an agent and/or length such calls have been in queue). The service level goal may comprise any goal or target to which an ACD system may be committed, such as answering, distributing and/or completing a certain percentage of incoming calls within a particular period of time. The modification amount may be calculated using any suitable method, such as traffic engineering models like an Erlang-B or Erlang-C model. At step 110, the at least one modified target time is presented to the first agent, for example, through an endpoint associated with the first agent using a processor. As indicated above, the receipt of one or more calls at an ACD may affect and lead to modifications of target call and wrap-up durations for a plurality of agents each currently handling their own calls. These modified durations may be presented to the agents individually as indicated above.

Some of the steps illustrated in FIG. 4 may be combined, modified or deleted where appropriate, and additional steps may also be added to the flowchart. Additionally, steps may be performed in any suitable order without departing from the scope of the invention.

As indicated above, technical advantages of particular embodiments of the present invention include utilizing a GUI to present adaptive goals for call and wrap-up durations to hosted and non-hosted call center agents. Particular embodiments may keep track of the time each caller has spent in his respective queue and may use this information to project if the caller's call will be answered within a committed SLG. An ACD system may calculate adaptive goals for call and wrap-up durations for call centers based on committed SLGs and variable conditions in the call center. Some embodiments may request that agents enter their projection for the additional time required to complete handling of their current contact and may use this information to calculate adaptive goals for each agent for their call and wrap-up durations. In addition, some embodiments may use a whisper feature, special GUI, or IM to alert agents that they need to provide the system with their estimation for the time it will take them to complete the handling of their current call. Particular embodiments provide historical reports which identify agents who rise to the occasion and complete their calls in a shorter period of when requested to do so.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and ACD 34a, these elements may be combined, rearranged or positioned in order to accommodate particular routing architectures or needs. In addition, any of these elements may be provided as separate external components to communication system 30, ACD 34a or each other where appropriate. The present invention contemplates great flexibility in the arrangement of these elements as well as their internal components.

It should be understood that the architecture and functionality of ACDs and call centers described above is applicable generally to all call or contact centers that operate to answer incoming calls and identify appropriate agents to receive the calls. Accordingly, the described ACDs may include those call or contact centers that are located within an enterprise and are staffed by enterprise employees. ACDs implementing various functionality described herein are not intended to be limited to hosted and outsourced call or contact centers.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for handling calls at an automatic call distribution system, comprising:
   receiving a first call for connection with one of a plurality of agents;
   distributing the first call to a first agent of the plurality of agents;
   presenting to the first agent at least one target time indicative of at least one target amount of time that the first agent is to spend handling the first call distributed to the first agent, wherein the at least one target time is specific to the first agent;
   modifying the at least one target time associated with handling the first call specific to the first agent based on call parameters and a service level goal, the call parameters comprising a status of a queue comprising calls awaiting connection with agents; and
   presenting the at least one modified target time associated with handling the first call to the first agent.

2. The method of claim 1, wherein the at least one target time associated with handling the first call comprises a target call duration.

3. The method of claim 1, wherein the at least one target time associated with handling the first call comprise a target call wrap-up duration.

4. The method of claim 1, wherein the call parameters comprise a duration of time the first agent has spent on the first call.

5. The method of claim 1:
   further comprising receiving feedback from the first agent regarding handling of the first call; and
   wherein modifying the at least one target time associated with handling the first call based on call parameters comprises modifying the at least one target time associated with handling the first call based on the feedback received from the first agent.

6. The method of claim 5, wherein the feedback comprises an estimation of the ability of the first agent to complete the first call within a target duration.

7. The method of claim 1, wherein the call parameters comprise a profile of a caller of the first call.

8. The method of claim 1, wherein the call parameters comprise an arrival rate of new incoming calls for connection with an agent.

9. The method of claim 1, wherein modifying the at least one target time associated with handling the first call based on call parameters and a service level goal comprises using an Erlang model to determine a target time modification.

10. The method of claim 1, wherein the service level goal comprises a percentage of incoming calls that must be distributed to an agent within a predefined time frame.

11. The method of claim 1, further comprising:
    receiving a second call for connection with one of a plurality of agents;
    distributing the second call to a second agent of the plurality of agents;
    presenting to the second agent at least one target time indicative of at least one target amount of time that the second agent is to spend handling the second call distributed to the second agent, wherein the at least one target time is specific to the second agent and different than the at least one target time specific to the first agent;
    modifying the at least one target time associated with handling the second call specific to the second agent based on the call parameters and the service level goal, the call parameters comprising handling of the first call by the first agent; and
    presenting the at least one modified target time associated with handling the second call to the second agent.

12. The method of claim 11:
    further comprising receiving feedback from the first agent regarding handling of the first call; and
    wherein modifying the at least one target time associated with handling the second call based on call parameters comprising handling of the first call by the first agent comprises modifying the at least one target time associated with handling the second call based on the feedback received from the first agent.

13. The method of claim 1, wherein the call parameters comprise the receipt of one or more additional calls each for connection with one of a plurality of agents.

14. The method of claim 1, further comprising modifying, based on receipt of the first call, at least one target time associated with the handling of one or more additional calls being handled by one or more agents.

15. The method of claim 1, further comprising requesting feedback from the first agent regarding handling of the first call while the first agent is handling the first call, the feedback request comprising a request for a prediction from the first agent of at least one of a duration of the first call and a duration of wrap-up of the first call.

16. A system for handling calls at an automatic call distribution system, comprising:
    an interface operable to receive a first call for connection with one of a plurality of agents;
    a distributor coupled to the interface and operable to distribute the first call to a first agent of the plurality of agents; and a processor coupled to the distributor and operable to:
  present to the first agent at least one target time indicative of at least one target amount of time that the first agent is to spend handling the first call distributed to the first agent, wherein the at least one target time is specific to the first agent;
  modify the at least one target time associated with handling the first call specific to the first agent based on call parameters and a service level goal, the call parameters comprising a status of a queue comprising calls awaiting connection with agents; and
  present the at least one modified target time associated with handling the first call to the first agent.

17. The system of claim 16, wherein the at least one target time associated with handling the first call comprises a target call duration.

18. The system of claim 16, wherein the at least one target time associated with handling the first call comprise a target call wrap-up duration.

19. The system of claim 16, wherein the call parameters comprise a duration of time the first agent has spent on the first call.

20. The system of claim 16, wherein:
  the processor is further operable to receive feedback from the first agent regarding handling of the first call; and
  a processor operable to modify the at least one target time associated with handling the first call based on call parameters comprises a processor operable to modify the at least one target time associated with handling the first call based on the feedback received from the first agent.

21. The system of claim 20, wherein the feedback comprises an estimation of the ability of the first agent to complete the first call within a target duration.

22. The system of claim 16, wherein the call parameters comprise a profile of a caller of the first call.

23. The system of claim 16, wherein the call parameters comprise an arrival rate of new incoming calls for connection with an agent.

24. The system of claim 16, wherein a processor operable to modify the at least one target time associated with handling the first call based on call parameters and a service level goal comprises a processor operable to use an Erlang model to determine a target time modification.

25. The system of claim 16, wherein the service level goal comprises a percentage of incoming calls that must be distributed to an agent within a predefined time frame.

26. The system of claim 16, wherein:
  the interface is further operable to receive a second call for connection with one of a plurality of agents;
  the distributor is further operable to distribute the second call to a second agent of the plurality of agents; and
  the processor is further operable to:
    present to the second agent at least one target time indicative of at least one target amount of time that the second agent is to spend handling the second call, wherein the at least one target time is specific to the second agent and is different than the at least one target time specific to the first agent;
    modify the at least one target time associated with handling the second call specific to the second agent based on the call parameters and the service level goal, the call parameters comprising handling of the first call by the first agent; and
    present the at least one modified target time associated with handling the second call to the second agent.

27. The system of claim 26, wherein:
  the processor is further operable to receive feedback from the first agent regarding handling of the first call; and
  the processor operable to modify the at least one target time associated with handling the second call based on call parameters comprising handling of the first call by the first agent comprises the processor operable to modify the at least one target time associated with handling the second call based on the feedback received from the first agent.

28. A system for handling calls at an automatic call distribution system, comprising:
  means for receiving a first call for connection with one of a plurality of agents;
  means for distributing the first call to a first agent of the plurality of agents;
  means for presenting to the first agent at least one target time indicative of at least one target amount of time that the first agent is to spend handling the first call distributed to the first agent, wherein the at least one target time is specific to the first agent;
  means for modifying the at least one target time associated with handling the first call specific to the first agent based on call parameters and a service level goal, the call parameters comprising a status of a queue comprising calls awaiting connection with agents; and
  means for presenting the at least one modified target time associated with handling the first call to the first agent.

29. Logic embodied in a computer readable medium, the computer readable medium comprising code that, when executed by a processor, is operable to:
  receive a first call for connection with one of a plurality of agents;
  distribute the first call to a first agent of the plurality of agents;
  present to the first agent at least one target time indicative of at least one target amount of time that the first agent is to spend handling the first call distributed to the first agent, wherein the at least one target time is specific to the first agent;
  modify the at least one target time associated with handling the first call specific to the first agent based on call parameters and a service level goal, the call parameters comprising a status of a queue comprising calls awaiting connection with agents; and
  present the at least one modified target time associated with handling the first call to the first agent.

30. The medium of claim 29, wherein the at least one target time associated with handling the first call comprises a target call duration.

31. The medium of claim 29, wherein the at least one target time associated with handling the first call comprise a target call wrap-up duration.

32. The medium of claim 29, wherein:
  the code is further operable to receive feedback from the first agent regarding handling of the first call; and
  code operable to modify the at least one target time associated with handling the first call based on call parameters comprises code operable to modify the at least one target time associated with handling the first call based on the feedback received from the first agent.

33. The medium of claim 32, wherein the feedback comprises an estimation of the ability of the first agent to complete the first call within a target duration.

34. The medium of claim 29, wherein the call parameters comprise a profile of a caller of the first call.

35. The medium of claim 29, wherein code operable to modify the at least one target time associated with handling the first call based on call parameters and a service level goal comprises code operable to use an Erlang model to determine a target time modification.

36. The medium of claim 29, wherein the service level goal comprises a percentage of incoming calls that must be distributed to an agent within a predefined time frame.

37. The medium of claim 29, wherein the code is further operable to:
  receive a second call for connection with one of a plurality of agents;
  distribute the second call to a second agent of the plurality of agents;
  present to the second agent at least one target time indicative of at least one target amount of time that the second agent is to spend handling the second call, wherein the at least one target time is specific to the second agent and is different than the at least one target time specific to the first agent;
  modify the at least one target time associated with handling the second call specific to the second agent based on the call parameters and the service level goal, the call parameters comprising handling of the first call by the first agent; and
  present the at least one modified target time associated with handling the second call to the second agent.

38. The medium of claim 37:
  wherein the code is further operable to receive feedback from the first agent regarding handling of the first call; and
  wherein code operable to modify the at least one target time associated with handling the second call based on call parameters comprising handling of the first call by the first agent comprises code operable to modify the at least one target time associated with handling the second call based on the feedback received from the first agent.

* * * * *